United States Patent
Keller et al.

(10) Patent No.: US 9,456,400 B2
(45) Date of Patent: Sep. 27, 2016

(54) BEST EFFORT CALL ROUTING PREFERENCE SETTING

(71) Applicant: Telefonaktiebolaget L M Ericsson (publ), Stockholm (SE)

(72) Inventors: Ralf Keller, Wurselen (DE); Fredrik Lindholm, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 28 days.

(21) Appl. No.: 14/390,218

(22) PCT Filed: Mar. 27, 2013

(86) PCT No.: PCT/EP2013/056602
§ 371 (c)(1),
(2) Date: Oct. 2, 2014

(87) PCT Pub. No.: WO2013/149918
PCT Pub. Date: Oct. 10, 2013

(65) Prior Publication Data
US 2015/0063298 A1    Mar. 5, 2015

Related U.S. Application Data

(60) Provisional application No. 61/619,207, filed on Apr. 2, 2012.

(51) Int. Cl.
*H04W 36/36* (2009.01)
*H04L 29/06* (2006.01)
*H04W 40/22* (2009.01)
*H04W 40/36* (2009.01)

(52) U.S. Cl.
CPC ........ *H04W 36/365* (2013.01); *H04L 65/1016* (2013.01); *H04L 65/1069* (2013.01); *H04L65/1073* (2013.01); *H04L 65/1083* (2013.01); *H04L 65/80* (2013.01); *H04W 40/22* (2013.01); *H04W 40/36* (2013.01)

(58) Field of Classification Search
CPC ............... H04L 65/1069; H04W 48/17–48/18
See application file for complete search history.

(56) References Cited

U.S. PATENT DOCUMENTS

| | | | | |
|---|---|---|---|---|
| 5,889,845 A | * | 3/1999 | Staples | H04L 29/06 379/100.08 |
| 2006/0077965 A1 | * | 4/2006 | Garcia-Martin | H04M 3/42195 370/352 |
| 2011/0090845 A1 | * | 4/2011 | Bishop | 370/328 |

FOREIGN PATENT DOCUMENTS

| | | |
|---|---|---|
| EP | 1892897 A1 | 2/2008 |
| GB | 2434059 A | 7/2007 |

OTHER PUBLICATIONS

"3rd Generation Partnership Project; Technical Specification Group Services and System Aspects; Voice Call Continuity Between CS and IMS Study (Release 7)", 3GPP Standard; 3GPP TR 23.806, 3rd Generation Partnership Project (3GPP), Mobile Competence Centre; 650, Route Des Lucioles; F-06921 Sophia-Antipolis Cedex, France, No. V7.0.0, Dec. 1, 2005, pp. 1-153, XP050363756.

(Continued)

*Primary Examiner* — Hassan Kizou
*Assistant Examiner* — Ashil Farahmand
(74) *Attorney, Agent, or Firm* — Patent Portfolio Builders, PLLC

(57) ABSTRACT

The invention refers to providing call control within a mobile network with respect to a subscriber associated to one or a plurality of user equipments (10), the mobile network comprising an application server—SCC-AS—(18) responsible for an access domain selection, the application server performing the receiving an indication to provide a best effort—BE—access domain with respect to the user equipment (10), and selecting an access domain in dependency of the received indication for routing a call with respect to the one or the plurality of user equipments. The invention further refers to an application server (18), a computer program loadable into the application server and a user equipment (10).

13 Claims, 7 Drawing Sheets

(56) References Cited

OTHER PUBLICATIONS

"3rd Generation Partnership Project; Technical Specification Group Services and System Aspects; IP Multimedia Subsystem (IMS) Centralized Services; Stage 2 (Release 11)", 3GPP Standard; 3GPP TS 23.292, 3rd Generation Partnership Project (3GPP), Mobile Competence Centre; 650, Route Des Lucioles: F-06921 Sophia-Antipolis Cedex, France, vol. SA WG2, No. V11.2.0, Mar. 8, 2012, pp. 1-118, XP050555352.

* cited by examiner

BEST EFFORT CALL ROUTING PREFERENCE SETTING

CROSS-REFERENCE TO RELATED APPLICATIONS

This application is a 35 U.S.C. §371 National Phase Entry Application from PCT/EP2013/056602, filed Mar. 27, 2013, and designating the United States, which claims priority to U.S. Provisional Application No. 61/619,207, filed Apr. 2, 2012. The above identified applications are incorporated by reference in their entirety.

TECHNICAL FIELD

The invention refers to call routing and especially refers best effort preference with respect to radio access selection.

BACKGROUND

Mobile communications networks are currently evolving from circuit switched (CS) networks towards packet switched (PS) networks, and by that integrate into Internet Protocol (IP) based infrastructures that are e.g. used by the Internet and the World Wide Web respectively.

More recently, an architecture called IP Multimedia Subsystem (IMS) has been defined by the Third Generation Partnership Project (3GPP) for delivering multimedia services over mobile communication networks. IMS is able to provide new and rich person-to-person communication services or network-to-person communication services by means of text, audio, video, and/or messaging or any combination thereof, employing IP for transport and Session Initiation Protocol (SIP) for service signaling. Hereto, calls from and to subscribers of the multimedia services using a Circuit Switched based access (e.g. WCDMA/GERAN), in the following also being referred to as CS access, are routed through the IMS network in order to reach an IMS service engine. This concept is called IMS Centralized Services (ICS), and is described in the standardization documents TS 23.237 (this application referring to release 11.3.0), TS 23.292 (this application referring to release 11.1.0), and 3GPP TS 23.228 (this application referring to release 11.3.0) established by the 3rd Generation Partnership Project—3GPP—.

Terminating Access Domain Selection T-ADS according to TS 23.292, section 5.3.1 provides:
Directs an incoming session to an ICS User;
For one or more UEs of an ICS User:
 Influences the selection of one or more contacts amongst the registered contacts and;
 Influences the selection of an access network for delivery of the incoming session to the selected contact, or;
 Performs breakout to the CS Domain by fetching the CSRN.

T-ADS shall take into account the access network's capabilities, UE capabilities, IMS registration status, CS status, existing active sessions, user preferences, operator policies such as access network specific voice domain preferences and the media component types. In addition, T-ADS may take into account the access network information provided directly by the UE.

The current procedures for T-ADS as described in current 3GPP documents might not provide for allowing a best effort packet switched access at choice of the user. The user might prefer a certain packet switched access even in cases where other packet or circuit switched access is available at presumably better quality. Such possibility of choice might be especially preferable e.g. in case that the subscriber has, besides the first line telephony service, also a second-line voice (or voice and video call) service that he or she prefers to use in certain areas or situations, e.g. when roaming, or in a hotel.

SUMMARY

It is an objective of the present invention to provide a possibility for performing best effort (packet switched) access even in cases of an available alternative access. This objective is achieved by the independent claims. Advantageous embodiments are described in the dependent claims.

According to embodiments, a service is provided with respect to a user equipment—UE—that allows conveying a best effort—BE—indication to an access application server, e.g. a so-called service centralization and continuity application server—SCC AS—as specified by 3GPP, being responsible for an access (domain) selection for the UE. The SCC AS initiates or controls an access selection in dependency of the BE information.

According to embodiments, during call control, the SCC AS identifies that a BE indication is present associated to the UE and performs an access selection with respect to the UE in accordance to the BE information. In an embodiment, the access selection, e.g. packet switched—PS—access selection, is performed regardless of a quality level (QoS) or capability supported (or guaranteed) for the radio access.

In an embodiment, the SCC AS initiates routing a call to PS access regardless if that is supporting IMS voice over PS access. In other words, even in case that IMS voice over PS access is not supported, the call is routed to PS access instead of routing the call over CS access. Thus, it allows the application server for terminating on PS access even if that is not supporting IMS Voice over PS access. Such termination might be provided either for voice and video call or for video call only.

Above described embodiments allow to control that terminated calls are not routed to CS access or other contacts.

In an embodiment, the CSS AS (e.g. by interacting with the HSS) retrieves currently used access information and/or IMS voice over PS support indication (as described in 3GPP specifications). In case that BE information is present and currently used access information indicates LTE or HSPA, the call is routed over PS access; otherwise, if the current access information indicates GERAN, the call is not routed to PS access.

In an embodiment, the BE indication is conveyed by means of a BE support information inserted in a SIP REGISTER message to be exchanged between a UE and the SCC-AS during SIP registration, wherein the such extended SIP REGISTER message might be sent via a P-CSCF, I-CSCF and S-CSCF. This indicator indicates that best effort access is supported and can be used.

Alternatively or additionally, the BE indication is inserted in a SIP INVITE transmitted from the UE to the SCC AS when originating a new call in order to inform that the call may be treated as a best effort call. In an embodiment, the SCC AS will not initiate any reservation of certain resources for the terminal but instead allows the media to be sent over a corresponding best effort bearer.

According to embodiments of the invention, depending on an indication provided to the SCC AS, the SCC AS forwards all terminating calls directed to a first terminal or contact to a second terminal or contact associated to BE PS access, e.g. to MSISDN1 if a call is ongoing on MSISDN2 (wherein MSISDN1 may be different from MSISDN2).

The present invention also concerns computer programs comprising portions of software codes in order to implement the method as described above when operated by a respective processing unit of a network node (SCC AS, S-CSCF) or user device. The computer program can be stored on a computer readable medium associated to the UE, the SCC AS, S-CSCF or any other node involved in the service provision as described above. The computer-readable medium can be a permanent or rewritable memory. The respective computer program can be also transferred to the user device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
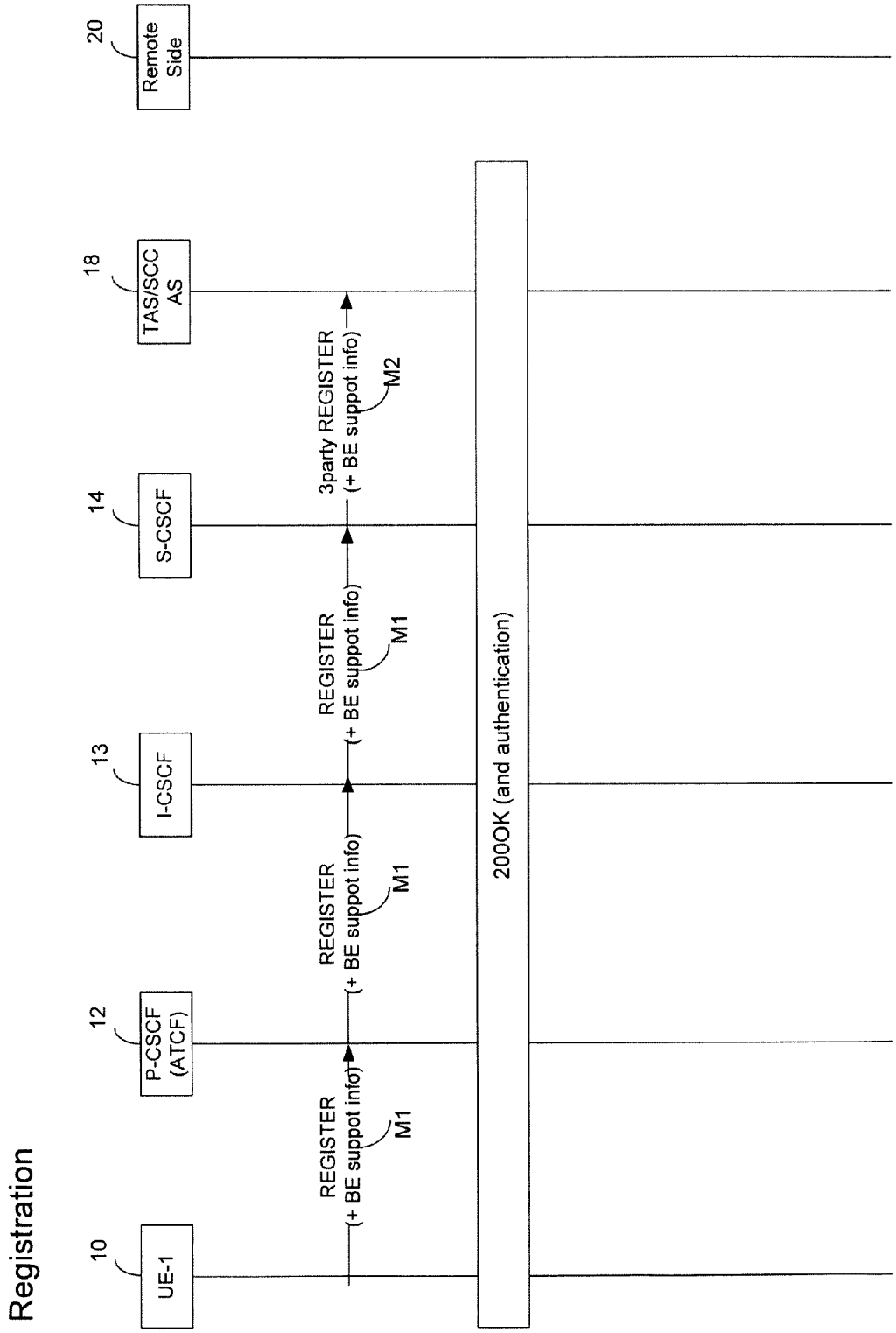
FIG. 1 shows a first sequence diagram showing an extended SIP registration at the network to comprising an indicator that that BE access is supported and can be used.

The FIGS. 1-7 involve amongst other nodes a user equipment UE 10, a P-CSCF 12, an I-CSCF 13, an S-CSCF 14, an HSS 16, and an application server 18 also being referred to as SCC AS 18 or as SCC AS/TAS 18, by way of example combining the SCC AS with a so-called Telephony Application Server—TAS—that carries out functions not directly related to the routing of messages through the network. Further information about these nodes and the further involved nodes can be retrieved from 3GPP specifications as cited above.

The HSS 16 is a database that supports the PS network entities in handling calls. It comprises subscription related information (e.g. being stored as subscriber profiles), performs authentication and authorization of the user, and might further provide information about the subscriber's location and address information (e.g. IP address). According to embodiments of the invention, the HSS interacts with the SCC AS to inform the SCC AS e.g. about the currently used access and IMS Voice over PS support indication.

The Call State Control Function—CSCF—nodes P-SCSF 12, I-CSCF 13 and S-CSCF 14 provide session control for user terminals by processing SIP signalling packets in the IMS.

The P-CSCF 12 (Proxy CSCF) is a SIP proxy that is the first point of contact for the terminal. Amongst other functions, this node supports a subscriber authentication and ensures that the IMS terminals do not behave correctly (by inspecting the signaling).

The S-CSCF 13 (Serving CSCF) is the central node of the signaling plane. It communicates with the HSS e.g. to get subscriber profiles This node further handles SIP registrations, which allows it to bind the user location (e.g. the IP address of the terminal) and the SIP address The I-CSCF 14 (Interrogating CSCF) is a SIP function e.g. located at the edge of an administrative domain. Its IP address is published in the Domain Name System (DNS) to be found by remote servers. Amongst other functions this node queries the HSS to retrieve the address of the S-CSCF and assign it to a user performing a SIP registration, and also forwards SIP request or response to the S-CSCF.

The service centralization and continuity application server—SCC AS-18 is a home network based IMS Application that provides functionality required to enable IMS Centralized Services. The SCC AS-18 may be regarded as a call control server (communicating by means of the SIP protocol) controlling a communication between the mobile terminal UE and a remote side (e.g. a further UE). Amongst other functions according to above-cited 3GPP standard TS 23.292 (e.g. section 5.3.1), the SCC AS 18 comprises so-called Terminating Access Domain Selection (T-ADS) capabilities comprising means to direct an incoming session to an ICS User. For one or more UEs of an ICS user, this function influences the selection of one or more contacts amongst the registered contacts and influences the selection of an access network for delivery of the incoming session to the selected contact, T-ADS shall take into account the access network's capabilities, UE capabilities, IMS registration status, CS status, existing active sessions, user preferences, operator policies such as access network specific voice domain preferences and the media component types. In addition, T-ADS may take into account the access network information provided directly by the UE 10.

For 3GPP PS access networks and for incoming sessions with bi-directional speech media destined to a selected contact, the SCC AS 18 retrieves (via the HSS) the most recent access network capabilities ("IMS voice over PS Session Supported Indication", current radio access technology—RAT—type). If the most recently used PS access network indicates that IMS voice over PS is supported, then bi-directional speech media can be delivered on this access. Otherwise, bi-directional speech media will not be delivered on this access unless no BE registration is stored in the SCC AS 18.

According to embodiments, a new indication referred to as BE support info is included in SIP REGISTER (e.g., as a new ICSI, new sub classed ICSI, new IARI, new other feature tag). The BE support info is indicative of a preference of PS access over CS access thus influencing an access domain selection with respect to the UE 10. The SCC AS 18 stores this information and will terminate future calls routed to PS access even if that is not supporting IMS voice over PS access. The SCC AS 18 may still interact with the HSS 12 to retrieve the currently used access (and IMS Voice over PS support indication as e.g. specified in TS 23.237, TS 23.401 and TS 23.060), but may only use the currently used access information to determine whether to route to PS access (e.g. OK, if LTE (Long Term Evolution) or HSPA (High Speed Packet Access) is currently used, and not OK if GERAN (GSM EDGE Radio Access Network) is currently used).

In the following exemplary sequence diagrams are shown with respect to different embodiments:

FIG. 1 shows an exemplary registration procedure being extended to include an additional indicator that indicates to the network that BE access is supported and can be used.

Thereto, the UE 10 may transmit a first SIP register message M1 over P-CSCF 12, I-CSCF 13 to S-SCSF 14. The first SIP register message comprises above described information indicative of BE support. The S-CSCF 14 may store this information and further send this information as SIP third party register information M2 to the SCC AS/TAS 18. The registration process may be terminated by a SIP OK sequence including UE authentication.

Figure 2:
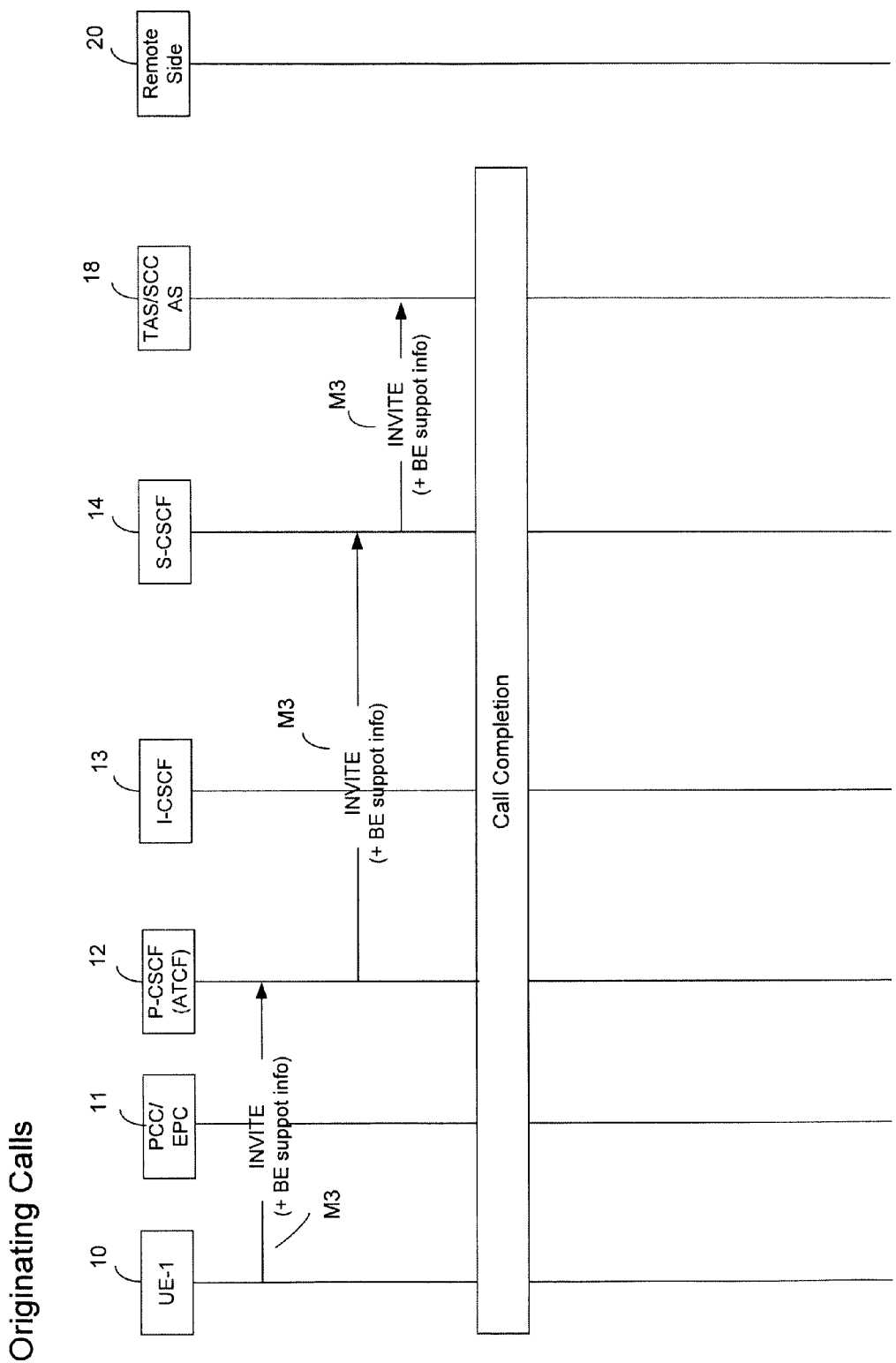
FIG. 2 shows a second sequence diagram showing to forwarding the indicator during an originating call to inform the network that the call may be treated as an best effort call.

FIG. 2 shows an exemplary sequence wherein the terminating UE sends a request for best effort PS access while originating a new call. When the UE 10 originates the new call, it may include the BE indicator to inform the network that the call may be treated as a best effort call. This may then result in that the network does not try to reserve special dedicated resources for the terminal, but instead only allows the media to be sent over a best effort bearer.

Thereto, the UE 10 may send a third SIP invite message M3 over an Evolved Packet Core—EPC—network 11, P-CSCF 12, S-CSCF 14 to SCC AS 18. The SIP invite message M3 comprises information indicative of a request for best effort PS access. In response to receiving the message M3 in the P-CSCF 14, the P-CSCF 14 will initiate a best effort bearer setup in the EPC 11. Call completion will then be performed taking into account the request.

Figure 3:
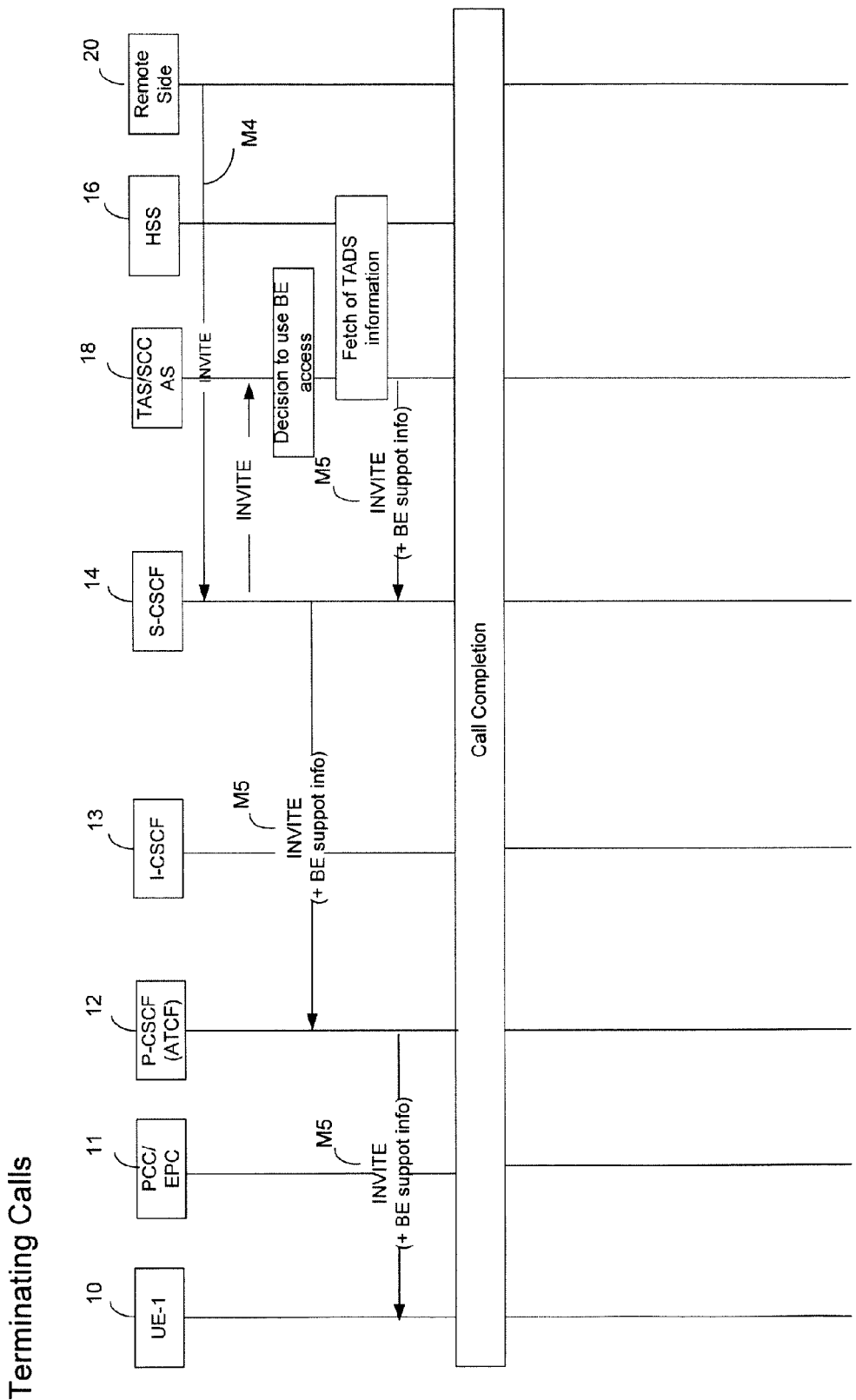
FIG. 3 shows a third sequence diagram showing both SCC AS terminal selection and access domain selection with respect to an incoming call.

FIG. 3 shows an exemplary sequence for an incoming call handling. The network (SCC AS/TAS) may do both contact/terminal selection and access domain selection. As part of these procedures, the SCC AS 18 may decide to which contact or terminal to route the call to (if more than one terminal or contact is present). This selection may include difference preferences. For example:

the SCC AS 18 first may try to terminate the call towards any of the contact(s)/terminal(s) that are/is not using best effort, but either CS access or a VoIP access according to T-ADS in TS 23.293 and TS 23.237; if this terminating fails, then the call may be routed over the indicated BE access (being stored in the SCC AS 18); or the SCC AS 18 may always try the BE access first, if an T-ADS information (e.g. from the HSS) suggests that the UE is still on UTRAN or E-UTRAN; if the UE is on GERAN (that may be considered as having too low throughput), the call is sent towards a contact or terminal (UEs/accesses) with VoIP support or CS access.

The SCC AS 18 may use the BE support info indicator to influence the S-CSCF 16 to select the UE 10 of which the BE support has been stored (and a corresponding access domain, e.g. PS access domain).

Thereto, a remote side (another UE) 20 may send a SIP invite message M4 to the S-CSCF 14, that forwards this message to the SCC AS 18. The SCC AS 18 detects a storage of a BE support info associated to the terminating user 10, performs contact/terminal selection (in case of a plurality of contacts/terminals)/access domain selection and sends an adapted SIP invite message M5 comprising the BE support info to influence/advice the S-CSCF 16 as discussed above.

Figure 4:
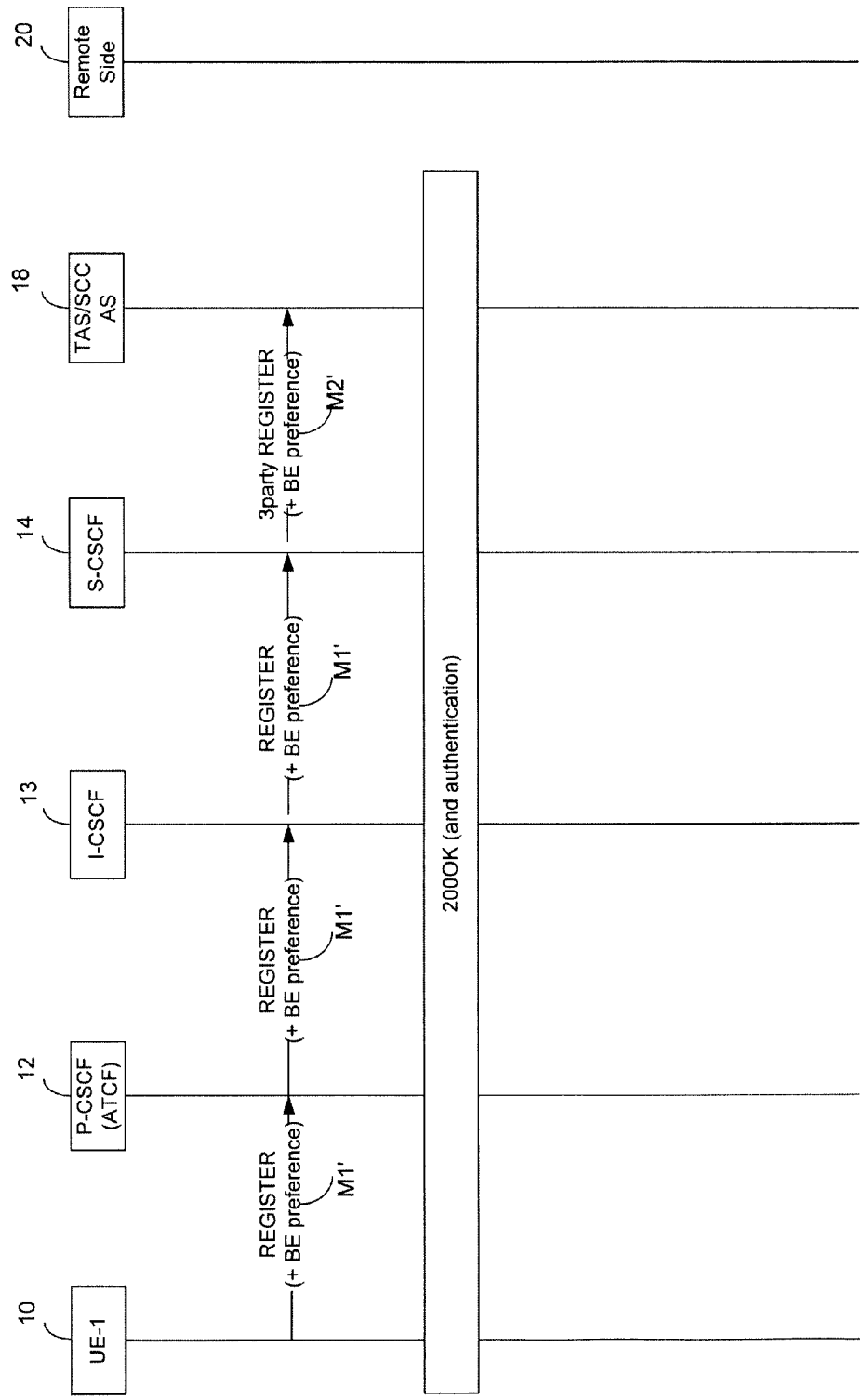
FIG. 4 shows a fourth sequence diagram for BE controlling that terminating calls are not routed to CS access, FIG. 5, 6 show a fifth and a sixth sequence diagram controlling forwarding all terminating calls to MSISDN1 if a call is ongoing on MSISDN2.

FIG. 4 shows an exemplary sequence allowing to control that terminating calls are not routed to CS access. According to the example, if a new indication BE preference (which may be realized by using the same tag as BE support info) is included in SIP REGISTER, all terminating calls are routed to this contact and not to CS access.

Thereto, a similar sequence as discussed under FIG. 1 may be performed with the difference that an variant SIP register message M1' is transmitted comprising a BE preference information to request a routing of terminating calls to this contact and not to any contact associated to CS access.

Figure 5:
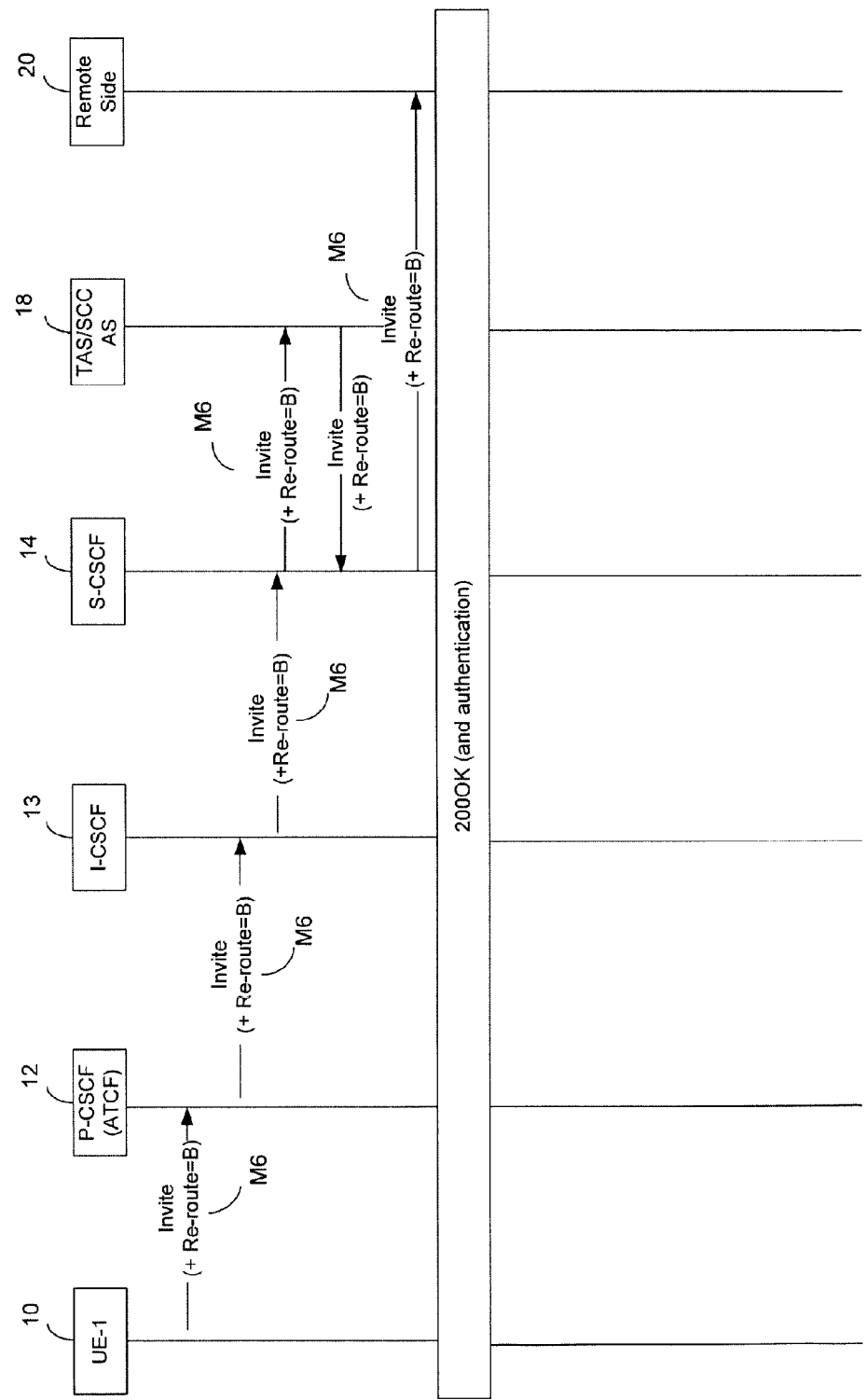

FIG. 5 shows an exemplary sequence allowing forwarding all terminating calls to MSISDN1 or number A (a Mobile Subscriber Integrated Services Digital Network Number—MSISDN—uniquely identifies a subscription in a GSM or a UMTS mobile network) if a call is ongoing on MSISDN2 or number B (MSISDN1 may be different from MSISDN2). According to the example, if an indication "Reroute" is included in the SIP INVITE for originating calls or responses in case of terminating call, the SCC AS 18 routes all terminating calls intended for a contact associated to the number/contact A to the contact for number B as long as this call with that reroute indication is ongoing (using BE PS access). The indication may be accompanied by B and may only be included on user request (i.e. based on a setting in the UE).

When the UE (10) establishes a call, it indicates in the call setup that it wishes to have any additional incoming calls redirected to the contact/number B (instead of its own contact/number A).

Thereto, the UE 10 may send a fourth SIP invite message M6 over P-CSCF 12, S-CSCF 14 to SCC AS 18. This SIP invite message M6 comprises information indicative of a preference to re-route to a further contact/terminal B as described above) In response to receiving this message in the SCC AS 18, a further call directed to the contact/terminal A is routed to the contact/terminal B using BE PS access domain.

Figure 6:
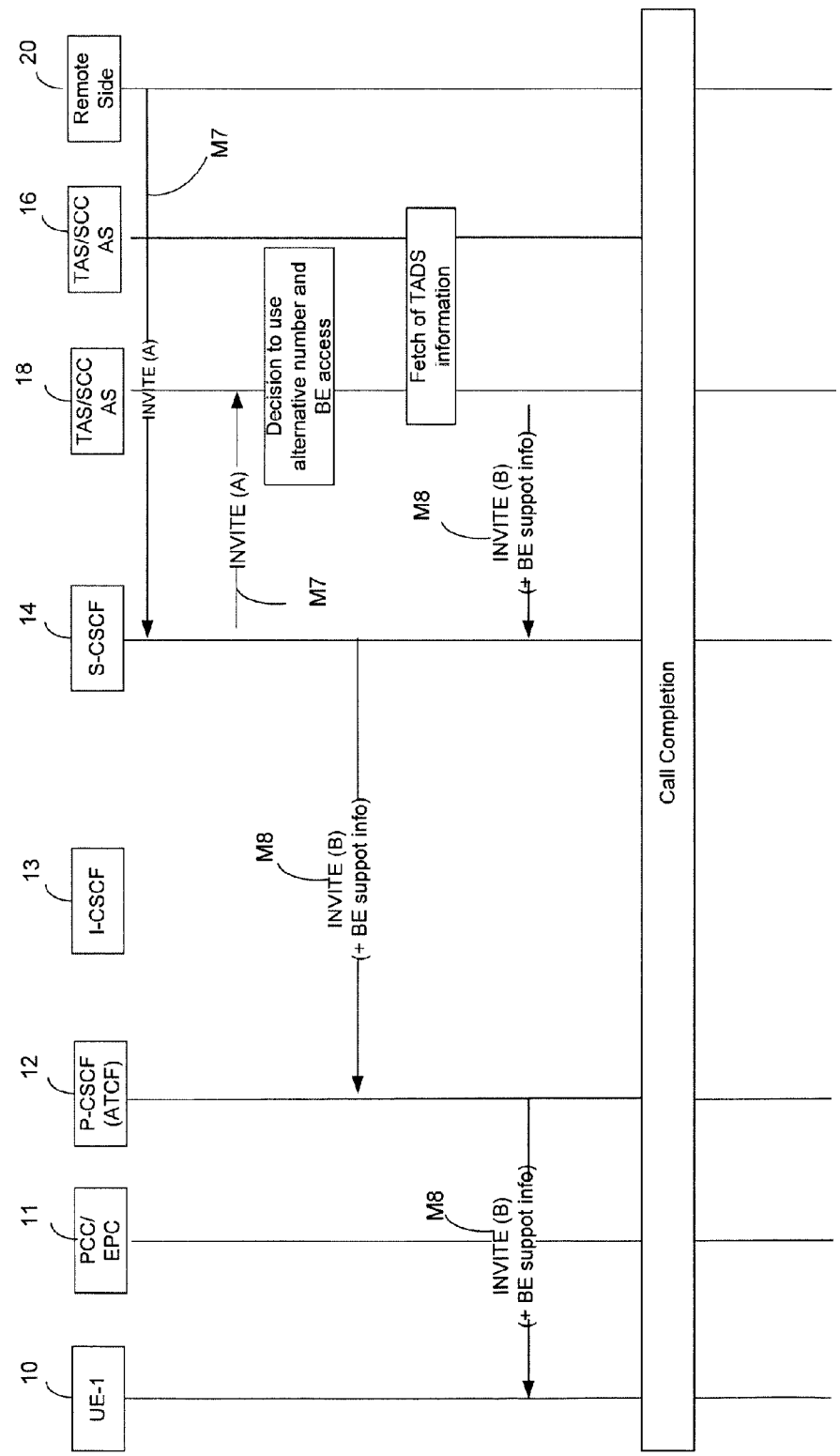

FIG. 6 shows an exemplary sequence corresponding to FIG. 5, wherein when retrieving the incoming call, the SCC AS 18 detects that an ongoing call is in progress, and that any new incoming call should be rerouted to the number/contact B.

Thereto the remote side 20 may send a SIP invite message directed to the number/contact A. over the S-CSCF 14 to the SCC AS 10. The SCC AS 18 decides to select a contact associated to the number/contact B using BE access and sends a correspondingly modified invite message towards the S-CSCF, that further forwards this message over the P-CSCF 12 to the terminating UE 10.

Figure 7:
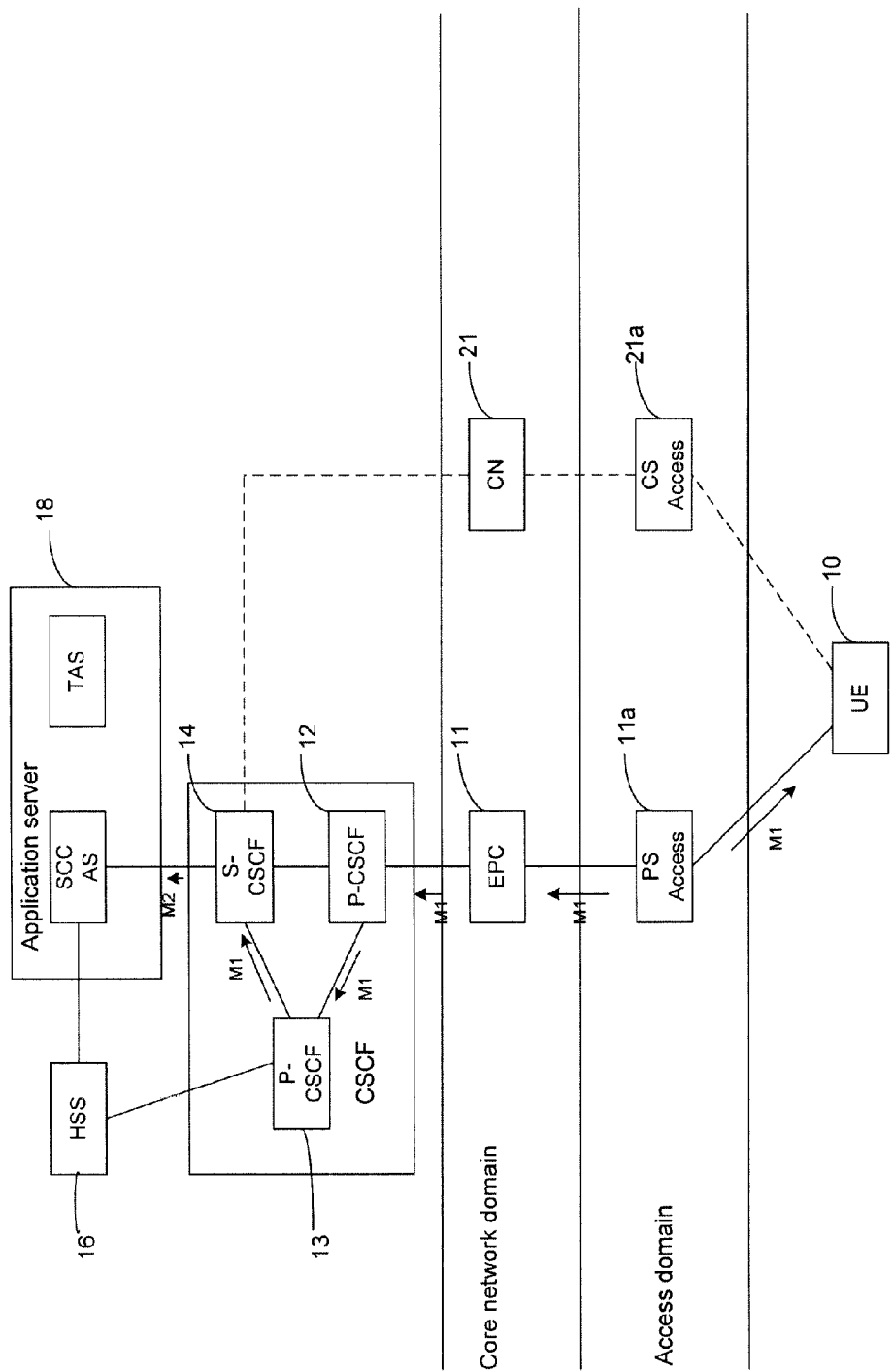
FIG. 7 shows a block diagram of an exemplary communication network for performing sequences described under FIG. 1-FIG. 6.

FIG. 7 shows a block diagram of an exemplary communication network comprising the UE 10, the evolved packet core 11, a PCRF comprising the P-CSCF 12, the I-CSCF 13, and the S-CSCF 14, the HSS 16, and the application server 18 comprising the SCC AS and the TAS as discussed above. Further PS access network 11a, a CS access network 21a and a CS core network 21 are shown. A fPS connection line is shown from the UE 10, over the PS access network 11a, the EPS 11, the CSCF nodes 12, 13, and 14 and the application server 18. A CS connection line is shown from the UE 10, over the CS access network 12a, the CS core network 11, and S-CSCF 14 to the application server 18. The UE 10 may have a plurality of terminals or contacts having different capabilities. The user may register a BE preference indication associated to a certain contact/terminal by means of sending the SIP register message M1 over the PS connection to the S-CSCF, that in turn sends this information as SIP $3^{rd}$ party information M2 to the application server as shown in FIG. 1. The application server 18 will perform terminal/contact selection taking into account the BE preference indication as discussed above.

Above described embodiments allow to choose a best effort access service within the frame of IMS. Amongst others, they allow to terminate on PS access even if that is not supporting IMS Voice over PS access, (e.g. either for voice and Videocall or for Videocall only). They further allow performing terminating call control in that CS access may not be used.

The invention claimed is:

1. A method of providing call control within a mobile network with respect to a subscriber associated to one or a plurality of user equipments (UEs), the mobile network comprising a packet switched (PS) access domain, a circuit switched (CS) access domain, and an application server (AS) responsible for an access domain selection, the application server performing the following steps:
receiving, from a UE, a routing request to establish a call to the subscriber, the request including an indication identifying a preferred access domain for routing the call;
receiving, from a Home Subscriber Server (HSS), access network capability information associated with the subscriber;
selecting an access domain for routing the call, where the access domain selection further comprises selecting the PS access domain responsive to determining that the access network capability information indicates that IP Multimedia Subsystem (IMS) Voice over PS is supported or selecting the PS access domain responsive to determining that the access network capability information indicates that IMS Voice over PS is not supported but that the received indication identifies the PS access domain as the preferred access domain; and
causing the call to be routed via the selected access domain.

2. The method of claim 1, wherein the AS retrieves user information associated to the UE, and wherein the AS does not route the call via the CS access domain to the UE if the user information comprises information indicating to select the BE access domain.

3. The method of claim 1, wherein the access domain selection is performed regardless of a quality level (QoS) or a capability supported or guaranteed with respect to a corresponding selected access domain.

4. The method of claim 1, wherein the AS initiates routing the call to the PS access domain instead of routing the call over the CS access domain regardless of IMS voice over PS access domain is supported.

5. The method of claim 1, wherein in response to the received indication, the AS will not initiate a reservation of certain resources for the UE but instead allows corresponding media to be sent over a corresponding best effort bearer.

6. The method of claim 5, wherein the AS terminates the call on the PS access domain even if that is not supporting IMS Voice over the PS access domain.

7. The method of claim 6, wherein a corresponding termination is provided either for voice and video call or for video call only.

8. The method of claim 1, wherein the AS, by interacting with a Home Subscriber Server (HSS), retrieves an information indicative of a currently used access, and
if said information indicates that the PS access domain is currently used the call is routed over the PS access domain, otherwise the call is routed to the CS access domain.

9. The method of claim 1, wherein the request for the BE access domain selection is conveyed by means of a support information inserted in a Session Initiation Protocol (SIP) REGISTER message to be received from the UE.

10. The method of claim 1, wherein the request for the BE access domain selection is conveyed by means of a support information inserted in a SIP INVITE message received from the UE.

11. The method of claim 1, wherein a first contact or network number and a second contact or network number is associated to the UE, and wherein if said indication is received stored or retrieved with respect to the UE, the AS forwards a terminating call directed to the first contact or network number to the second contact or network number.

12. An application server, in a network including a packet switched (PS) access domain and a circuit switched (CS) access domain, comprising:
a receiver adapted to:
receive, from a user equipment (UE), a routing request to establish a call to a subscriber, the request including an indication identifying a preferred access domain for routing the call, and
receive, from a Home Subscriber Server (HSS), access network capability information associated with the subscriber; and
a processor adapted to:
select an access domain for routing the call, where the access domain selection further comprises selecting the PS access domain responsive to determining that the access network capability information indicates that IMS Voice over PS is supported or selecting the PS access domain responsive to determining that the access network capability information indicates that IMS Voice over PS is not supported but that the received indication identifies the PS access domain as the preferred access domain; and
cause the call to be routed via the selected access domain.

13. A computer program product comprising a non-transitory computer readable medium storing a computer program, which when run by a processing unit of an application server, causes the application server to execute the method of claim 1.

* * * * *